United States Patent
Peregi et al.

(10) Patent No.: US 10,632,684 B2
(45) Date of Patent: Apr. 28, 2020

(54) APPARATUSES AND METHODS FOR ULTRASONIC SEALING

(71) Applicant: Herrmann Ultrasonics, Inc., Bartlett, IL (US)

(72) Inventors: Uwe Peregi, Bartlett, IL (US); Scott Weiss, Bartlett, IL (US)

(73) Assignee: Herrmann Ultrasonics, Inc., Bartlett, IL (US)

( * ) Notice: Subject to any disclaimer, the term of this patent is extended or adjusted under 35 U.S.C. 154(b) by 22 days.

(21) Appl. No.: 15/992,676

(22) Filed: May 30, 2018

(65) Prior Publication Data

US 2019/0366646 A1 Dec. 5, 2019

(51) Int. Cl.
| | |
|---|---|
| *B32B 37/00* | (2006.01) |
| *B29C 65/08* | (2006.01) |
| *B65B 51/22* | (2006.01) |
| *B29C 65/00* | (2006.01) |
| *B29L 31/00* | (2006.01) |

(52) U.S. Cl.
CPC .......... *B29C 65/08* (2013.01); *B29C 66/4312* (2013.01); *B65B 51/225* (2013.01); *B29L 2031/712* (2013.01)

(58) Field of Classification Search
USPC ............................................ 156/580.1, 580.2
See application file for complete search history.

(56) References Cited

U.S. PATENT DOCUMENTS

| | | | | |
|---|---|---|---|---|
| 8,572,936 | B2 * | 11/2013 | Mancin | B29C 65/02 |
| | | | | 53/548 |
| 8,651,163 | B1 | 2/2014 | Widhalm | |
| 9,272,802 | B2 | 3/2016 | Hull | |
| 9,278,481 | B2 * | 3/2016 | Hull | B29C 66/43 |
| 10,414,098 | B2 * | 9/2019 | Aurand | B29C 66/849 |
| 2017/0152064 | A1 | 6/2017 | Aurand | |
| 2017/0297755 | A1 | 10/2017 | Matheny | |

FOREIGN PATENT DOCUMENTS

| | | |
|---|---|---|
| EP | 1350614 | 10/2003 |
| EP | 1904286 | 4/2008 |
| WO | 2012123415 | 9/2012 |
| WO | 2014022798 | 2/2014 |

\* cited by examiner

*Primary Examiner* — James D Sells
(74) *Attorney, Agent, or Firm* — Frost Brown Todd LLC; Dennis S. Schell; Kevin C. Oschman (57) ABSTRACT

An apparatus for ultrasonic sealing and methods for manufacturing disclosed. Embodiments include a base and a tool profile for sealing a material, for example, a package. The tool profile is supported by the base and defines a seal line forming raised surface extending across a length of the base and having a crest line of uniform height above the base. In at least one embodiment, the raised surface includes a first portion of the length having a first cross-sectional mass and second and third portions of the length having a second cross-sectional mass, with the first cross-sectional mass being less than the second cross-sectional mass. Advantageously, a package to be sealed can be positioned such that its thicker material areas line up with the first portion of the raised surface having reduced mass, which applies less energy to the package than is applied along the larger mass portions.

17 Claims, 10 Drawing Sheets

FIG. 14

APPARATUSES AND METHODS FOR ULTRASONIC SEALING

COPYRIGHT NOTICE

A portion of the disclosure of this patent document contains material which is subject to copyright protection. The copyright owner has no objection to the facsimile reproduction by anyone of the patent disclosure, as it appears in the United States Patent and Trademark Office patent files or records, but otherwise reserves all copyright rights whatsoever.

FIELD

Embodiments of this disclosure relate generally to apparatuses and methods for ultrasonic sealing and, more particularly, to improved anvil and sonotrode tool profiles for ultrasonically sealing a material having varying amounts of layers, thickness, or material composition.

BACKGROUND

Ultrasonic welding is an industrial technique which uses high-frequency ultrasonic acoustic vibrations that are locally applied to workpieces being held together under pressure to create a solid-state weld. It is commonly used for plastics, and especially for joining dissimilar materials. In ultrasonic welding, there are no connective bolts, nails, soldering materials, or adhesives necessary to bind the materials together. Similar to thermal processes, ultrasonic welding generates material melts to achieve molecular bonding of the layers. An advantageous difference from common heat welding is that the heat generated by ultrasonic welding is internally located in the packaging material itself rather than by conductions from the external layers to the inside sealing surfaces.

"Ultrasonic sealing" is a type of ultrasonic welding which is used in many applications specifically for sealing multiple flexible material layers, for example, thermoplastic packaging films used in the food and other industries. During the ultrasonic sealing process, the mechanical vibrations are transferred into the packaging material by the sonotrode. This takes place at a specific frequency, with a defined force and corresponding amplitude, for a specific period of time. The ultrasonic vibrations cause friction producing heat among the molecular chains at the surfaces of the layers of the packaging material. Ultrasonic sealing forms a seal between the material layers by using at least a sonotrode and an anvil. Piezoelectric transducers create ultrasonic vibrations that the sonotrode applies to the material layers to be sealed, which are held firmly between the sonotrode and anvil. The interaction of the sonotrode and the anvil applies a particular seal profile to the material layers. The tool profile of the sonotrode and/or anvil produce and shape the resulting seal by focusing the energy of the ultrasonic vibration.

However, it was realized by the inventors of the current disclosure that problems exist when sealing some materials over an area that changes in thickness or material composition, and that improvement in ultrasonic sealing tools are needed. Therefore, embodiments of the present disclosure address these and other needs and provide other important advantages.

SUMMARY

Embodiments of the present disclosure provide improved apparatuses and methods for ultrasonic sealing. A hermetic and strong seal can be made across a flexible film package using ultrasonic sealing technology despite varying material film thicknesses and other characteristics. The apparatuses and methods disclosed herein can improve aesthetics and create a uniform inner seal edge of sealed packages. The uniform seal edge can prevent potential tear points, unsealed areas and other disadvantages caused by insufficient or excess sealant melting along a seal line having varying material characteristics.

In accordance with one embodiment of the present disclosure, an apparatus for ultrasonic sealing can include a base and a tool profile for sealing a material, the tool profile supported by the base and defining a raised surface extending across a length of the base and having a crest line of uniform height above the base extending across the raised surface. The raised surface can include a first portion of the length having a first cross-sectional mass and a second portion of the length having a second cross-sectional mass. Further, the first cross-sectional mass can be less than the second cross-sectional mass. Advantageously, a package to be sealed can be positioned such that its thicker material areas line up with the first portion of the raised surface having reduced mass, which applies less energy to the package than is applied along the larger mass portions.

The apparatus of the present disclosure can include additional features to allow for sealing various arrangements of films. For example, the apparatus can include a third portion of the length, the third portion having a third cross-sectional mass which can be equal to the second cross-sectional mass, and the first portion can be located between the second and third portions. The apparatus can further include one or more transitional portions having varying cross-sectional masses.

In accordance with another embodiment of the present disclosure, an ultrasonic sealing apparatus can be configured to seal a material with portions having at least a first and second thickness or material characteristic. The apparatus can include a sonotrode, an anvil, and a tool profile defined by at least one of the sonotrode and anvil. The tool profile can define a planar base and an elevated seal line contour protruding from the planar base, the elevated seal line contour including at least a first portion and a second portion along a length of the anvil. Further, the first portion can include a first cross-sectional mass, the second portion can include a second cross-sectional mass, and the second cross-sectional mass can be less than the first cross-sectional mass. The elevated seal line contour can protrude a uniform maximum height from the planar base along the entire length of the elevated seal line contour.

In accordance with yet another embodiment of the present disclosure, a method of manufacturing a tool profile configured for ultrasonic sealing can include providing a support base having an elongated length and an elevated seal line contour having a uniform maximum height across the elongated length of the support base, and forming a first portion of the elevated seal line contour to have a first cross-sectional mass and a second portion of the elevated seal line contour to have a second cross-sectional mass. The method can also include forming a first transitional portion of the elevated seal line contour to connect the first and second portions and to have a cross-sectional mass which transitions from the first cross-sectional mass where connected to the first portion to the second cross-sectional mass where connected to the second portion.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting unless specifically recited in the claims.

DETAILED DESCRIPTION OF THE ILLUSTRATED EMBODIMENTS

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Ultrasonic welding is a process in which one or more pieces of material, typically thermoplastic materials, are fused together without the use of adhesives, mechanical fasteners, or the direct application of heat, but instead are fused together by producing a molecular bond between the materials. Although plastic and thermoplastics are materials commonly used for ultrasonic welding, it should be appreciated that welding may be performed for many types of materials such as, as another example, metal. Ultrasonic welding may be performed for similar materials, and sometimes even dissimilar materials. Oftentimes, ultrasonic welding is used to join two or more materials because the application of heat to join them tends to distort larger areas of the material to be joined. The technique instead subjects the materials to high frequency, low amplitude vibrations. The material to be welded may have an area where the material or materials are lapped to form a seam that is sandwiched between what is typically a fixed or moveable anvil and a fixed or moveable sonotrode.

'Ultrasonic sealing," as used herein, refers to the use of ultrasonic welding techniques to seal two or more layers of flexible material such as those used in food packaging or other industries utilizing product packaging. For example, ultrasonic sealing techniques can be used to seal stand up pouches, bags, capsules, spouts, valves, zippers, cartons, blister cups, bowls, tubes, tea bags, or other similar products. With ultrasonic sealing, any heat required for melting and forming a weld is only generated inside a sealing layer such as, for example, a thermoplastic sealing layer. For localized conversion of vibrations to friction heat, the anvil or sonotrode profiles are generally linear and include radii or narrow plateaus. These profiles ensure focusing of the energy input and therefore short sealing times, for example, between 100 and 200 milliseconds. With ultrasonic sealing, heat is generated at the inside of the film, not by heat input from the outside as is the case with heat sealing, for example. The sonotrode and anvil that come into direct contact with the packaging material both remain cool during the entire sealing process.

A common issue with ultrasonic sealing is that it is difficult to create uniform and functional seals across flexible films having varying material thickness or material composition along the length of the seal by using conventional anvil or sonotrode tool profiles. Variations in material composition or thickness arise from details in package films such as changes in the number of layers at fin seals, overlap seals, and gusseted areas, or due to pre-existing heat seals.

Embodiments of the present disclosure solve at least the issues noted above and provide other advantages. Embodiments include a tool profile, for example, defined by the anvil, having a seal line geometry or contour with varying overall cross-sectional mass to prevent excess sealant melting, overstressing, weakening, or other damage to the material film that would likely otherwise occur if a constant tool profile mass is used along the length of the seal or if the crest of tool profile is relieved or removed in areas along the length of the seal.

Figure 1:
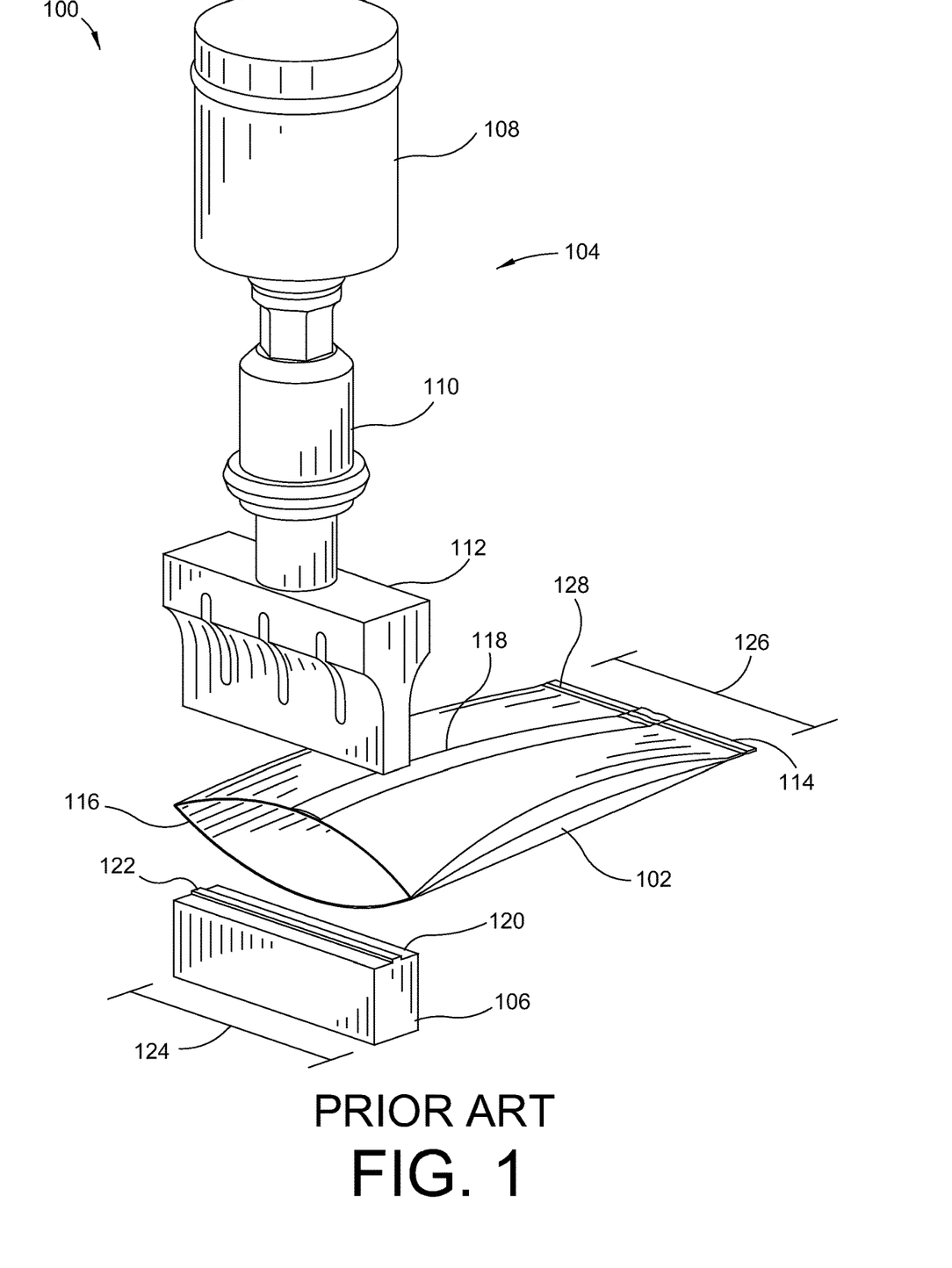
FIG. 1 illustrates a top perspective view of an ultrasonic sealing machine, including an anvil with a prior art tool profile, demonstrating a technique of sealing an illustrative package.

Depicted in FIG. 1 is an ultrasonic sealing system 100 demonstrating a technique of sealing a package 102. The system 100 generally includes an ultrasonic sealing machine 104 and an anvil 106. The machine 104 typically includes at least a converter 108, an optional booster 110, and a sonotrode (or "horn") 112, wherein the combination of these three parts is often referred to as the "ultrasonic stack."

An ultrasonic generator (not shown) converts a supply voltage into a high frequency signal, for example, between 20 and 35 kHz. This electrical signal is converted into mechanical vibrations by the converter 108 using the inverse piezoelectric effect. The converter 108 is driven by high frequency electrical power and it brings the entire ultrasonic stack into a resonant vibration. The vibrations are transferred to the materials to be sealed by means of the booster 110 and sonotrode 112. The booster (or, "amplitude coupler") 110 increases or decreases the given amplitude from the converter 108 and also enables the sonotrode 112 to attach to the machine 104. The sonotrode 112 increases or decreases the amplitude of the vibrations from the booster 110 and transmits the vibrations (or, "ultrasonics") to the materials. Sonotrodes are often custom-designed and built for each application and typically consist of materials such as titanium, aluminum, or hardened steel. The anvil 106 is a passive counterpart to the sonotrode and typically provides the rigid work surface required for sealing. The applied force and mechanical vibration of the sonotrode 112 brought in contact with the package which is supported by the anvil 106 create intermolecular heat between the contact surfaces of the packaging material, which in turn causes the material to melt and fuse together. Anvils can consist of the same materials as sonotrodes.

As illustrated in FIG. 1, an ultrasonic sealing machine 104 can be used to seal a package 102, oftentimes sealing the opposing ends 114, 116 or by creating a center seal 118, although sealing can take place at any preferred location of the package 102. To create an end seal, the packaging material to be sealed is centered across the anvil 106. Similar to the sonotrode 112, the anvil 106 can be custom-designed and built for use with a particular sealing application.

Illustrated in FIG. 1 is an anvil 106 having a prior art tool profile, including raised seal line contour 122 which is typical of prior art tool profiles used for sealing the ends of packages, for example, packages comprised of thin thermoplastic packaging material. The prior art anvil 106 consists of a planar base surface 120 and the centrally located raised seal line contour 122 spanning the length 124 of the anvil. The raised seal line contour 122 has a uniform maximum height above the planar base surface and a uniform width. To perform a complete seal across the end 116 of the package 102, the length 124 of the anvil 106 is generally equal to or greater than the width 126 of the package 102 to be sealed. For sealing, the package 102 is moved into position over the raised seal line contour 122 of the anvil 106 and the sonotrode 112 moves toward the anvil 106 and stops once it makes contact at a sufficient pressure with the anvil 106. Once sufficient pressure is reached between the sonotrode 112 and anvil 106 with two or more layers of unsealed packaging material secured between them (as shown by package end 116), the machine 104 initiates ultrasonic sealing. Once complete, a seal 128 is formed (as shown by package end 114). The sealing profile of the prior art anvil 106, consisting of the planar base 120 and the raised seal line contour 122, creates a seal 128 across the end 116 of the package 102, like that shown at end 114. The seal 128 profile is defined by the anvil 106, more particularly, by the raised seal line contour 122 which directs the energy applied by the sonotrode 112 to the package 102 during sealing. That is, the size and shape of the seal 128 is closely correlated with the size and shape of the raised seal line contour 122 of the anvil 106.

Figure 2:
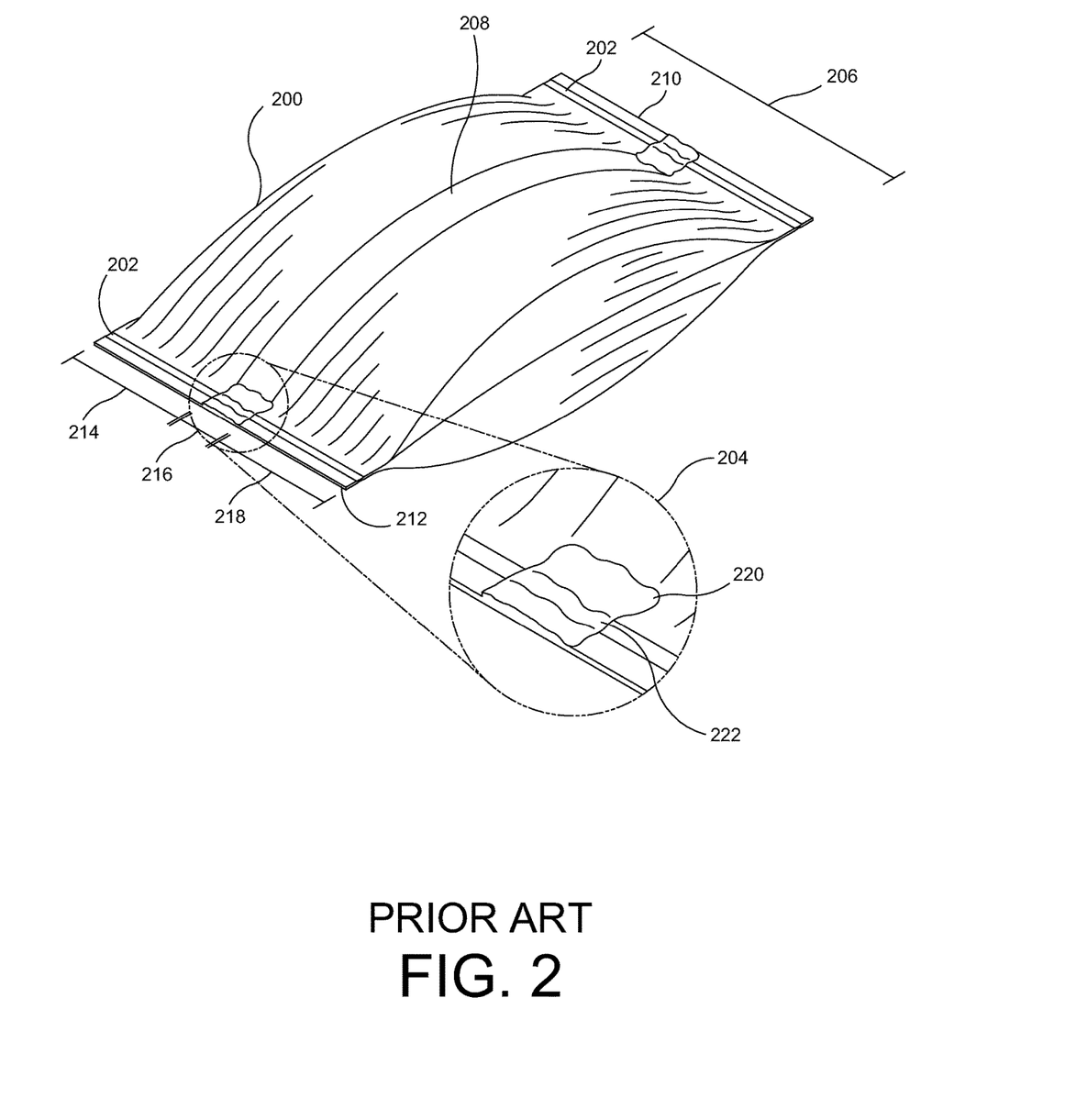
FIG. 2 illustrates a top perspective view of an illustrative package after having been sealed using the ultrasonic sealing machine and prior art anvil and technique of FIG. 1, including a portion of the package seal magnified to show detail.

Depicted in FIG. 2 is a package 200, which is an example of a package sealed at both ends, that is similar to package 102. The package 200 illustrates a resulting seal 202 and an enlarged view thereof, similar to seal 128, which has been sealed using the prior art anvil 106 of FIG. 1. Magnified section 204 of the seal 202 details a central area of the seal 202 relative to the width 206 of the package 200. The central area is comprised of multiple layers of material including a center seal 208. Many packages utilize a center seal 208 and center seals come in many varieties, for example, standard lap seals, reverse lap seals, standard fin seals, reverse fin seals, offset fin seals, reverse offset fin seals, and pinch seals. Each center seal type is formed by bringing together and/or folding two or more layers of packaging materials and sealing them together using ultrasonic welding, heat, glue or any other technique available to bind the layers together. As result, the ends 210, 212 of the package comprise sealing areas having varying numbers of layers of material. For example, as shown in FIG. 2, the end 212 of the package 200 comprises a first portion 214 having two layers of material to seal together, a second portion 216 having three or more layers of material to seal together due to the presence of the center seal 208, and a third portion 218 having two layers of material to seal together. It should be appreciated that, while one illustrative package and sealing application is shown, packages may be formed into various shapes and sizes and may be comprised of different materials; therefore the number of material layers, the seal sizes, and the layering arrangements of the materials can vary in any given application.

Problems are experienced by sealing systems utilizing prior art anvils for sealing packages having varying numbers of layers of material. An anvil having a raised sealing surface with a uniform height and width, such as the raised seal line contour 122 of the anvil 106 illustrated in FIG. 1, does not account for the varying numbers of layers of material and, as a result, does not produce a seal 202 which is uniform in appearance, footprint, and strength across the entire seal 202. Magnified portion 204 details the center seal 208 making up the second portion 216 of the seal 202 to illustrate at least some of the sealing issues with prior art anvils. While a prior art anvil may produce a uniform and functional seal for the first and third portions 214 and 218 of the seal, the extra layers of material in the second portion 216 result in over-melting 220 creating cosmetic blemishes and/or reduced strength stress points due to too much pressure being applied during sealing to the extra material layers and material pushing away from the area around the center seal 208. The center seal point 222 itself may also contain blemishes, stress points, and/or a weakened or compromised seal. If the ultrasonic welding pressure and/or application time is reduced to prevent the over-welding occurring in second portion 216, the occurrence of under-welding and lack of a hermetic seal or a weak seal in the first and third portions 214 and 218 is likely.

Although one type of prior art anvil is illustrated, it should be appreciated that other prior art anvils exist which are inadequate in solving the above-described problem, or otherwise provide other undesirable aspects. For example, other prior art anvils may include a raised surface of uniform width and non-uniform height, wherein the height of the raised surface decreases at the area of a package with multiple layers of material. However, one of the common problems with this solution is that it may not result in a seal which is strong enough to withstand the pressures and environments commonly experienced by sealed packages in later processing and transit.

Figure 3:
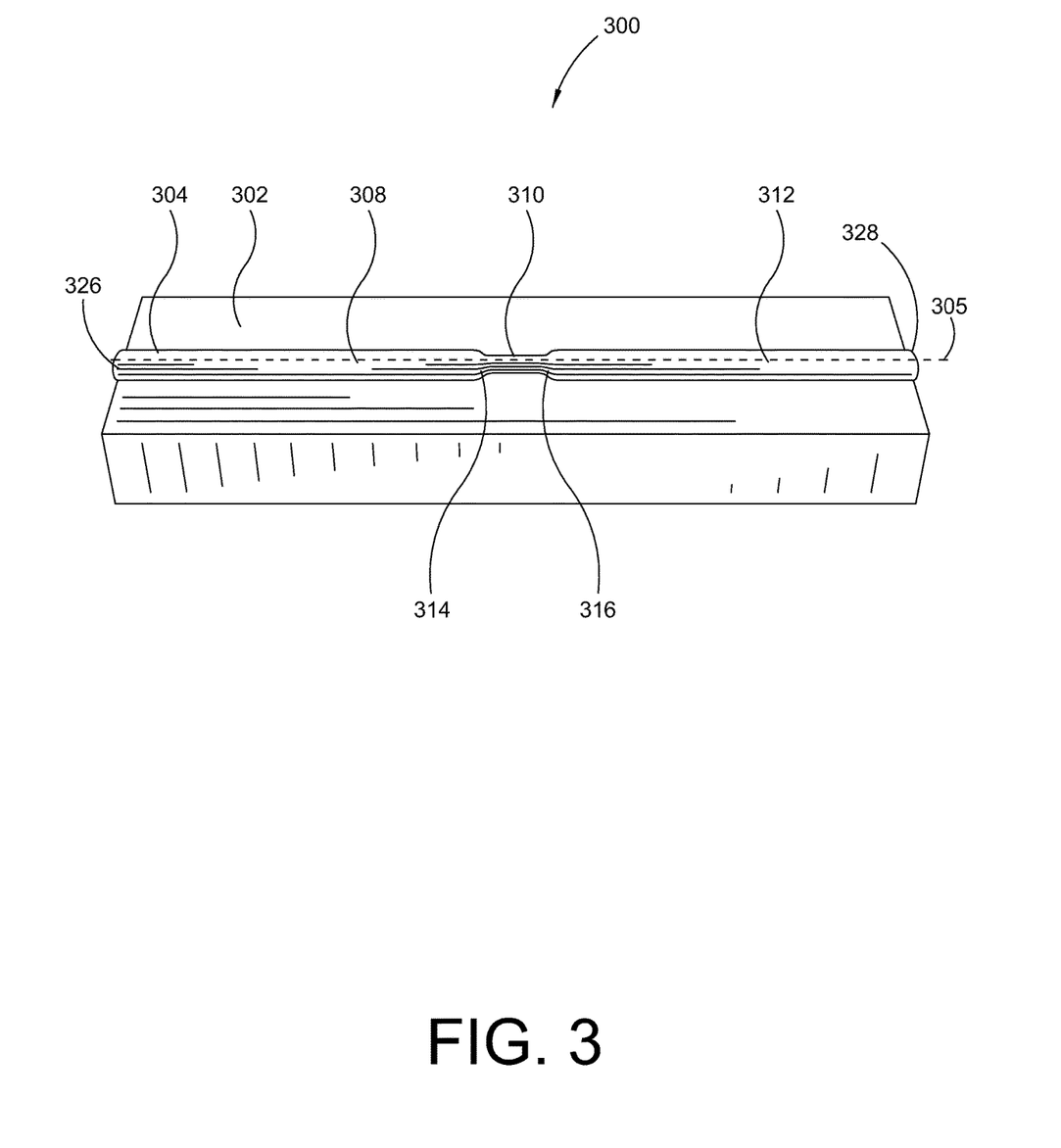
FIG. 3 illustrates a top perspective view of an ultrasonic sealing tool having a tool profile according to a first embodiment of the present disclosure.
Figure 4:
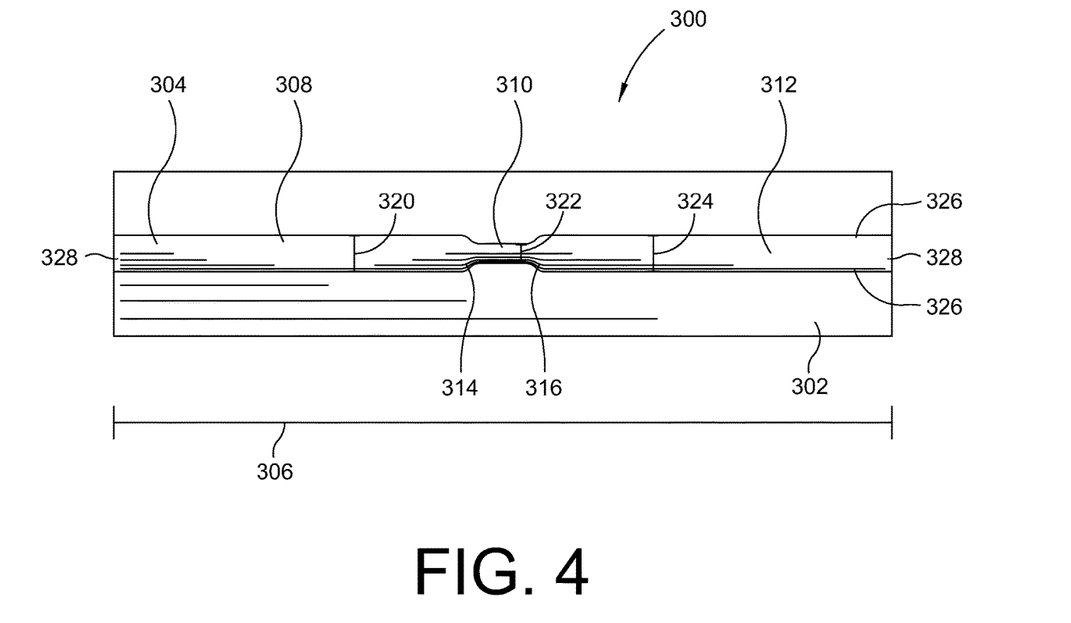
FIG. 4 illustrates a top view of the ultrasonic sealing tool and tool profile of FIG. 3.
Figure 5:
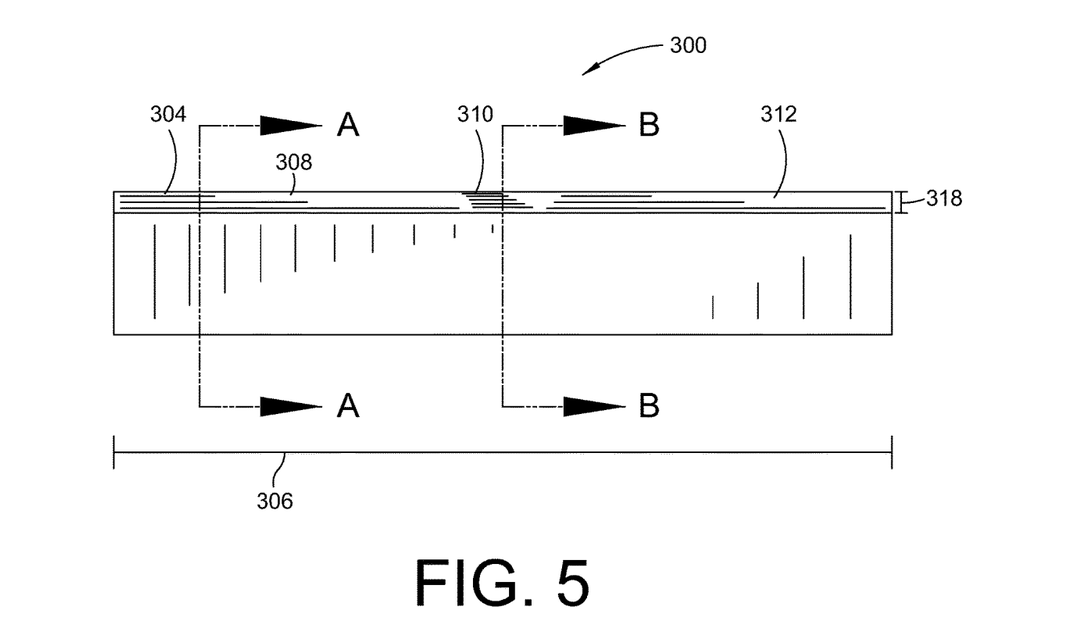
FIG. 5 illustrates a side view of the ultrasonic sealing tool and tool profile of FIG. 3.

Depicted in FIGS. 3-5 is an ultrasonic anvil 300 according to one embodiment of the present disclosure. The ultrasonic anvil 300 includes a tool profile having a planar base surface (or, "shoulder") 302 and a raised seal line contour 304. The raised seal line contour 304 has a uniform maximum height along a crest line 305 that extends across the length 306; however, raised seal line contour 304 has sections of different cross-sectional masses across the length 306 of the anvil 300. The raised seal line contour 304 includes a first portion 308 having a first cross-sectional mass (or, "radius") 320, a second portion 310 having a second cross-sectional mass 322, and a third portion 312 having a third cross-sectional mass 324. For example, in the embodiment shown in FIGS. 3-5, the first portion 308 and third portion 312 have equal cross-sectional masses, and the second portion 310 has a cross-sectional mass less than that of the first portion or section portion.

The crest line 305 is located at the peak (or 'crest') of the raised seal contour line 304 along its entire length. In this embodiment of anvil 300 the crest line 305 is a straight line; however, curvilinear or other shaped lines could be substituted as long as the vertical distance between the crest line to the planar surface is equidistant along its entire length. In order to provide a crest line 305 for the raised seal line contour 304 of uniform height across portions 308, 310, 312 of varying cross-sectional masses, in the embodiment of anvil 300, each radius of the raised seal line contour may vary for the various portions.

Advantageously, a package can be positioned such that its thicker material areas line up with the second portion 310 of the raised seal line contour 304 having reduced mass. The reduced mass portion 310 of the seal line contour 304 applies less mechanical stress to the package than is applied along the larger mass portions 308 and 312. By applying less mechanical stress to the thicker areas of the material film of multiple layers, such as sections that already include a center seal, reduced energy is applied thereby reducing the likelihood of overstressing that portion of material film. This simultaneously ensures there is sufficient sealing by areas of the tool profile having an increased mass which are applied to thinner areas of the material lacking a preexisting center seal.

Figure 6:
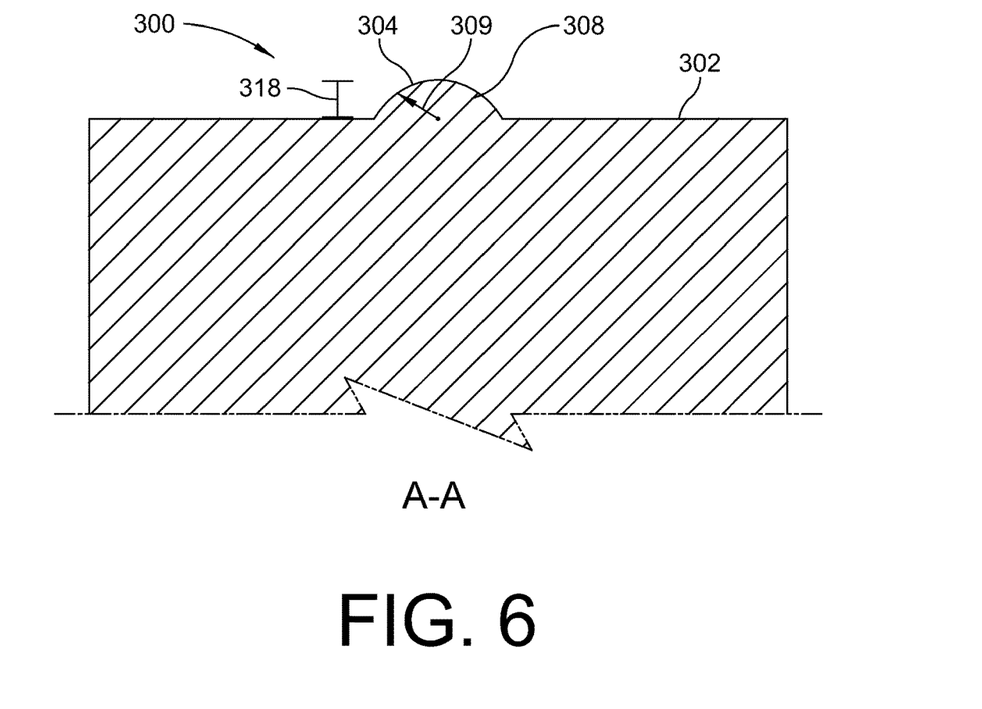
FIG. 6 illustrates a cross-sectional view of the tool profile taken along line A-A of FIG. 5.
Figure 7:
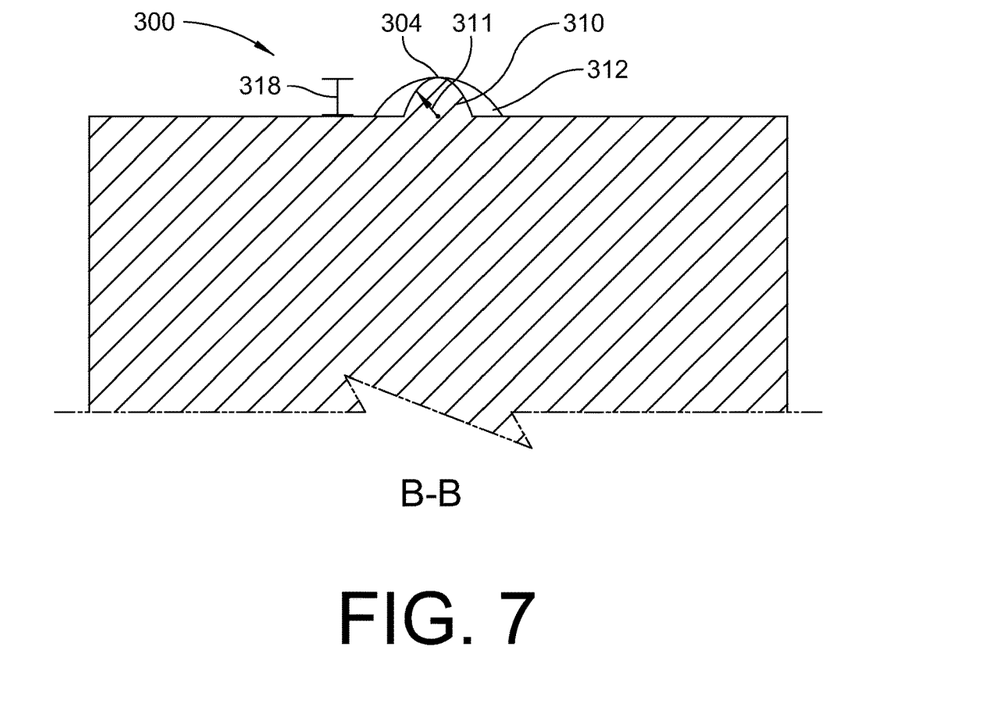
FIG. 7 illustrates a cross-sectional view of the tool profile taken along line B-B of FIG. 5.

In the illustrative embodiment shown in FIGS. 3-5, the cross-sectional mass is varied by varying the radius of but not the height of the second portion 310 as compared to first and second portions 308 and 312. As shown in FIGS. 6 and 7, the reduced mass of the second portion 310 a cross-sectional radius that is less than that used for the first portion 308 and the third portion 312; however, other methods of reducing the mass could be substituted as long as the height of the crest line 305 remains uniform across the entire seal line contour 304.

Connecting the first portion 308 and the second portion 310 is a first transitional portion 314 having a cross-sectional mass which transitions between the first cross-sectional mass 320 to the second cross-sectional mass 322, for example, a linear transition. Connecting the second portion 310 and the third portion 312 is a second transitional portion 316 having a mass which transitions between the second cross-sectional mass 322 to the third cross-sectional mass 324, for example, a linear transition. The transition lengths can be selected based on a potential range of movement in the location or width along the length 306 of the seal line contour 304 made by the material layers during sealing that are associated with the second portion 310 of the seal line contour 304. For example, a minimum and maximum width of a central seal in the package and a maximum misalignment of the central seal with the center of anvil 300 can be taken into account when determining the width of the second portion 310 and the width of the transitional portions 314, 316. In some embodiments, the transitional portions 314, 316 do not linearly transition between their respective cross-sectional masses but instead may, for example, sharply move from one cross-sectional mass to the other cross-sectional mass without a transitional portion.

Figure 9:
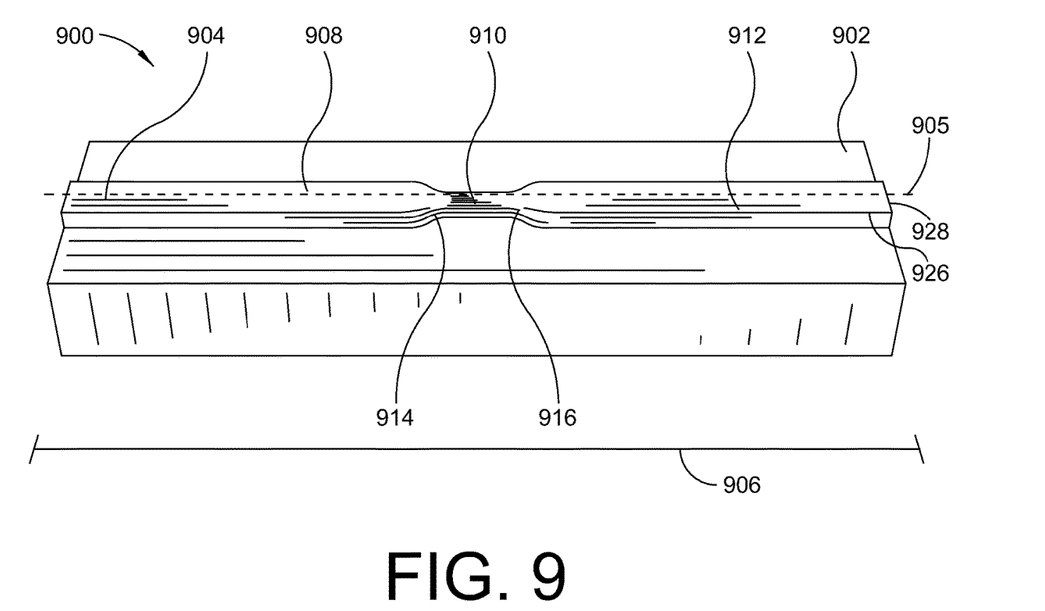
FIG. 9 illustrates a top perspective view of an ultrasonic sealing tool having a tool profile according to a second embodiment of the present disclosure.

The edges 326 of the raised seal line contour 304 are curvilinear or otherwise rounded the illustrative embodiment. In other embodiments, for example, as shown in FIG. 9, the edges 326, 926 can be squared-off (e.g. cornered with a 90 degree angle) at a point between the crest line 305, 905 of the raised seal line contour 304, 904 and the junction with the planar base surface 302, 902. The ends 328 of the raised seal line contour 304 can be curvilinear to make a smooth transition toward the planar base 302, or can be squared-off (as illustrated).

As depicted in FIGS. 5-7, the seal line contour 304 has a maximum height 318 at crest line 305 that remains uniform across the entire length 306 of the seal line contour 304, or alternatively, the height 318 remains uniform across a length of the seal line contour 304 which is greater than the length of the material to be sealed. When in use, the unsealed material's positioning across the seal line contour 304 may vary slightly. By having a uniform height of the seal line contour 304, this ensures the same amount of sealing pressure is applied across the material even if the material is misaligned during the production process, which results in a sealed and uniform inner seal edge. The uniform inner seal edge will prevent both an unsealed length along the seal and a potential tear point caused by excess material melting. The height 318 of the crest line 305 of the seal line contour 304 can be, for example, 1.0-3.0 millimeters from the planar base surface 302. In an exemplary embodiment, the height of the crest line 305 can be about 1.0 millimeters from the planar base surface 302. The radius 309 for first portion 308 and third portion 312 can be, for example, 2.5-5.0 millimeters and the radius 311 for the second portion 310 can be, for example, 1.0-2.5 millimeters. In an exemplary embodiment, the radius 309 of the first portion 308 and third portion 312 can be, for example, 2.5 millimeters and the radius 311 for the second portion 310 can be, for example, 1.0 millimeters. In other embodiments, the first portion 308, second portion 310, and third portion 312 can each have different cross-sectional masses.

Figure 8:
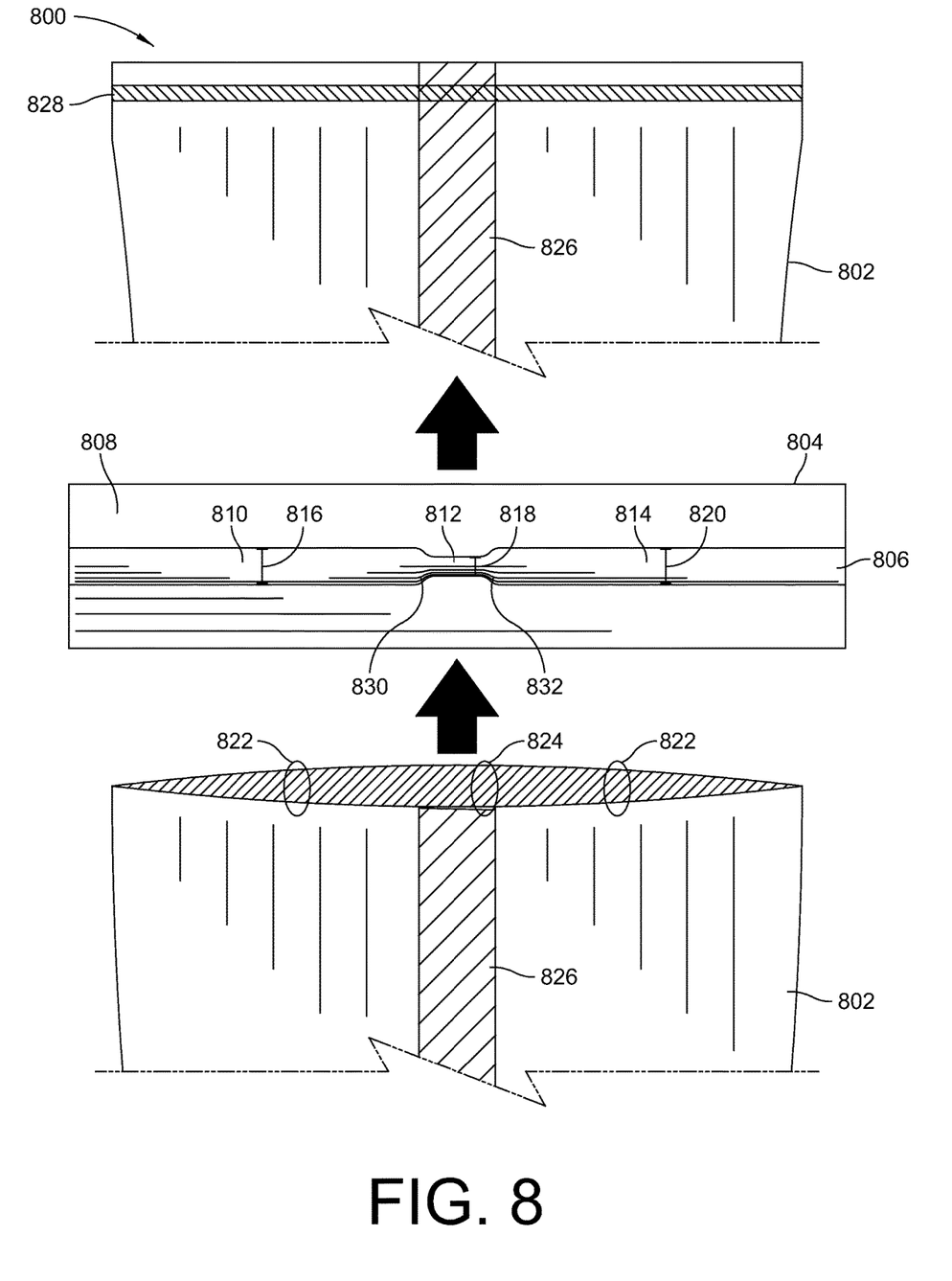
FIG. 8 illustrates a top view of the ultrasonic sealing tool of FIG. 3 along with an illustrative package before and after being sealed.

Depicted in FIG. 8 is a method 800 of sealing an illustrative package 802 according to one embodiment of the present disclosure. The method 800 includes an anvil 804 having a tool profile comprised of a seal line contour 806 and a planar base 808. To seal the package 802, the package materials are lined up with the anvil 804, preferably centered horizontally on the anvil 804, and the sonotrode (not shown) applies ultrasonic vibrations to the package 802 while pressing the package 802 against the anvil 804. Advantageously, the package 802 can be positioned such that its thicker material areas 824 line up with a portion 812 of the anvil 804 having reduced mass. A reduced mass portion 812 of the seal line contour 806 can reduce the energy applied to thicker areas 824 of the material film of multiple layers, such as sections that already include a center seal 826, thereby preventing overstressing of that portion of material film. This also simultaneously ensures sufficient sealing in areas of the tool profile having an increased mass and applied to thinner areas 822 of the material which lack a preexisting center seal 826.

The cross-sectional mass of the seal line contour 806 can vary to correspond to variations in material composition or thickness expected along the length of the seal line contour 806 while the height of a crest of the seal line contour 806 remains uniform along the length. The seal line contour 804 mass provided by the second portion 812 of the anvil 804 in thicker material areas 824 (e.g., due to more layers) can be reduced by providing a smaller radius. For example, the seal line contour 806 can include first 810 and third 814 portions having cross-sectional masses 816, 820 with 2.5 millimeter radii to be applied to seal thinner areas 822 of packaging material, such as those having two layers of material. For the thicker areas 824 of packing material, such as those have three or more layers of material, the seal line contour 806 can include a second portion 812 corresponding to the location of the thicker material 824 and having a cross-sectional mass 818 with a 1.0 millimeter radius. Additionally, the first transition portion 830 and second transition portion 832 of the seal line contour can be, for example, 3.0 millimeters in transition length to allow for up to 3.0 millimeters in package 802 alignment variation. In another example sealing application, a tool profile having a seal line contour 806 including first portion 810 and third portion 814 with 2.0 millimeter radii to be applied to seal thinner areas 822 of packaging material, and a second portion 812 with a 0.5 millimeter radius to seal thicker areas 824 of packaging material.

Varying the cross-sectional mass of the anvil 804 prevents excess material melting, overstressing and weakening, damage to labeling or finishing, and other damage to the material film that would likely otherwise occur if a uniform tool profile mass (as illustrated in FIG. 1) is used for the seal line contour 806 regardless of variations in thickness or composition of the material to be sealed. Therefore, the finished end seal 828 is uniform in appearance, footprint, and strength across the entire seal 828.

Depicted in FIG. 9 is a first alternative anvil 900 according to some embodiments of the present disclosure. The anvil 900 includes a tool profile having a planar base surface 902 and a raised seal line contour 904 having sections of different cross-sectional masses across the length 906 of the anvil 900. The raised seal line contour 904 includes a first portion 908 having a first cross-sectional mass (or, "radius") 920, a second portion 910 having a second cross-sectional mass 922, a third portion 912 having a third cross-sectional mass 924, and a crest line 905 having a uniform height above the planar base surface 902 across all three portions 908, 910, 912.

In some embodiments, the first 908 and third 912 portions have equal cross-sectional masses. Connecting the first portion 908 and the second portion 910 is a first transitional portion 914 having a cross-sectional mass which transitions between the first cross-sectional mass 920 to the second cross-sectional mass 922, for example, a linear transition. Connecting the second portion 910 and the third portion 912 is a second transitional portion 916 having a mass which transitions between the second cross-sectional mass 922 to the third cross-sectional mass 924, for example, a linear transition. The transition lengths can be selected based on a potential range of movement in the location or width along the length 906 of the seal line contour 904 made the material layers during sealing that are associated with the second portion 910 of the seal line contour 904. In some embodiments, the transitional portions 914, 916 do not linearly transition between their respective cross-sectional masses but instead may, for example, sharply change from one cross-sectional mass to the other cross-sectional mass without a transitional portion. The edges 926 of the raised seal line contour 304 are squared-off, resembling a plateau, for the first 908 and third 912 portions, and rounded for the second portion 910. The first 914 and second 916 transition portions therefore transition both in radius and from cornered to curvilinear edges. In some embodiments, the ends 928 of the raised seal line contour 904 are curved to make a smooth transition toward the planar base 902, while in other embodiments the ends 928 can be sharply cornered (as illustrated).

Figure 10:
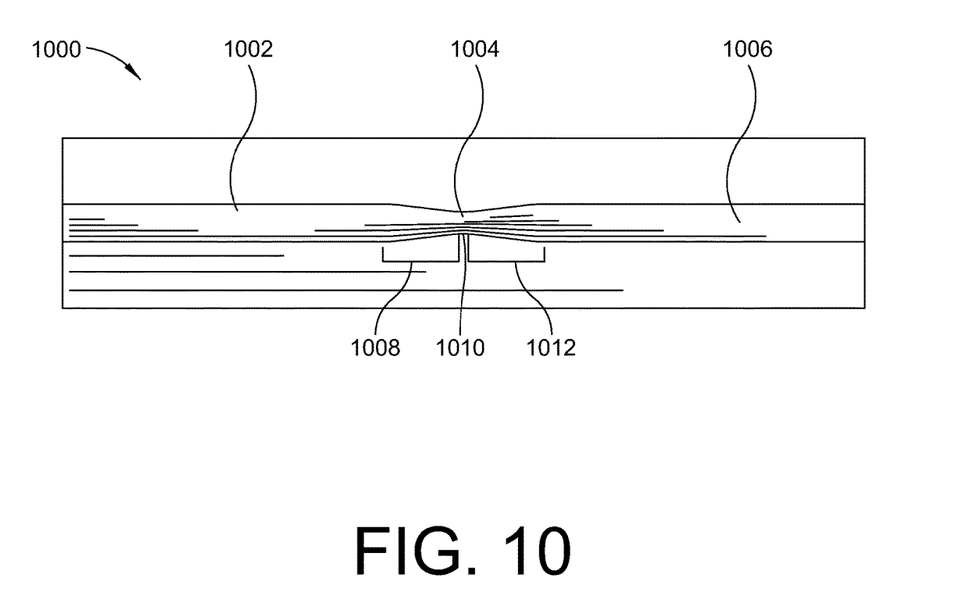
FIG. 10 illustrates a top view of an ultrasonic sealing tool and tool profile according to a third embodiment of the present disclosure.

Depicted in FIG. 10 is a second alternative anvil 1000 according to other embodiments of the present disclosure. In this embodiment, the anvil 1000 presents a slight variation from the anvil as shown and described in FIGS. 3-8. The anvil 1000 includes first 1002, second 1004, and third 1006 seal line contour portions, wherein in this embodiment the second portion 1004 resembles the shape of a bowtie. That is, the second portion 1004 comprises a first transition 1008 from the cross-sectional mass of the first portion 1002 to a central point 1010, and a second transition 1012 from the central point 1010 to the cross-sectional mass of the third portion 1006. The transitions 1008, 1012 may be, for example, linear transitions.

Figure 11:
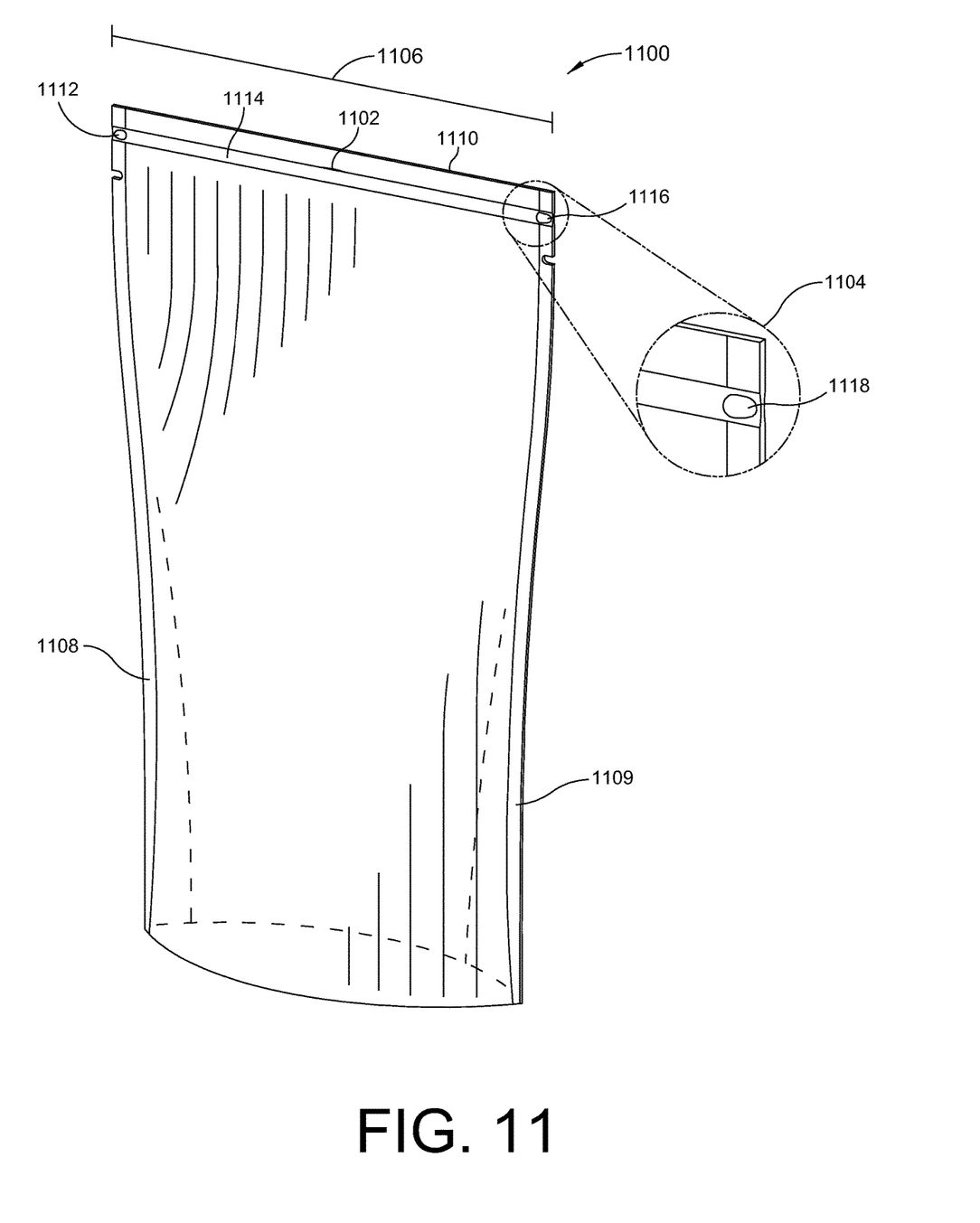
FIG. 11 illustrates a side perspective view of an illustrative package after having been sealed using an ultrasonic sealing machine and a prior art anvil, including a portion of the seal magnified to show detail.

Depicted in FIG. 11 is a second variation of a package 1100 which can be ultrasonically sealed using the sealing apparatuses and methods disclosed herein. The package 1100 illustrates a resulting seal 1102 spanning the width 1106 of the package and an enlarged view thereof which has been sealed using a prior art anvil, such as the prior art anvil illustrated in FIG. 1. Many packages, such as stand up pouches, utilize side seals (or, "manufacturer's seals") 1108, 1109. Side seals 1108, 1109 are often formed by bringing together two or more layers of packaging materials and sealing them together using heat to melt and bind the layers together. As result, seal 1102 at the end 1110 of the package to be sealed comprises a combination of a central unsealed area 1114 and side pre-sealed areas 1112, 1116. More specifically, the end 1110 of the package 1100 comprises a first portion 1112 to be sealed which includes a pre-applied perpendicular heat seal 1108, a second portion 1114 to be sealed comprising two separated material layers, and a third portion 1116 to be sealed which again includes a pre-applied perpendicular heat seal 1109. It should be appreciated that, while one illustrative package and sealing application is shown, packages may be formed into various shapes and sizes and may be comprised of different materials; therefore the number of material layers, the seal sizes, and the layering arrangements of the materials can vary in any given application.

Problems are experienced by sealing systems utilizing prior art anvils for sealing packages having pre-applied heat seals, such as the heat seals 1108, 1109 illustrated in FIG. 11. An anvil having a tool profile with a raised sealing surface with a uniform height and width, such as the raised seal line contour 122 of the anvil 106 illustrated in FIG. 1, does not account for the pre-stressed characteristic of the heat sealed materials and, as result, does not produce a seal 1102 which is uniform in appearance, footprint, and strength across the entire seal 1102. Magnified portion 1104 details the third portion 1116 of the seal 1102 to illustrate this issue with tool profiles of prior art anvils. While a prior art anvil may produce a reliable, uniform, and cosmetically appealing seal for the second portion 1114 of the seal, the heat-sealed material in the first 1112 and third 1116 portions result in over-melting 1118 creating cosmetic blemishes, film damage, and/or stress points due to too much pressure being applied to the pre-stressed material during sealing. To the extent pressure or time used for ultrasonic sealing is reduced to prevent over-melting 1118, then another problem typically arises in that the second portion 1114 may not under-melted and not sealed or have a seal that lacks sufficient strength.

Figure 12:
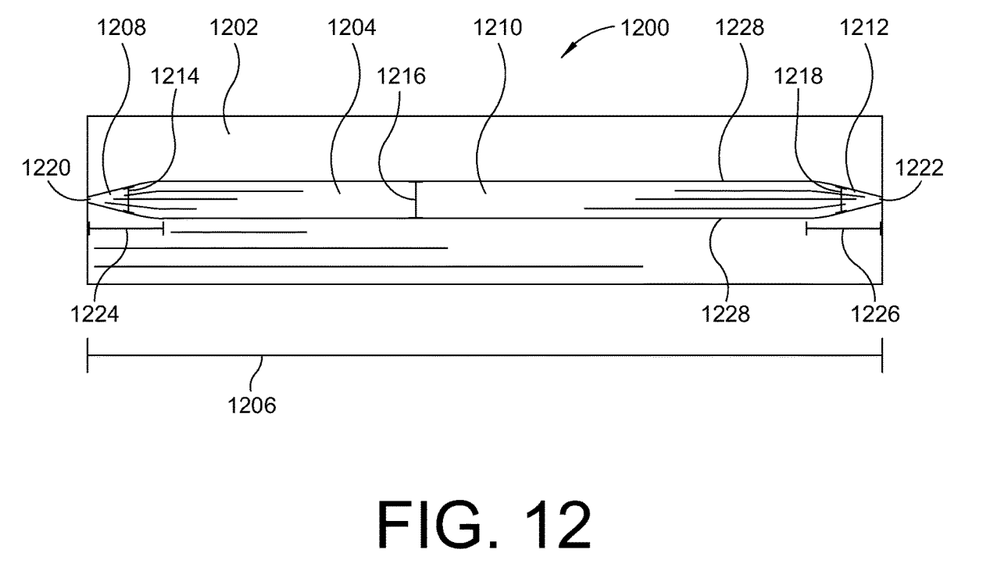
FIG. 12 illustrates a top view of an ultrasonic sealing tool and tool profile according to a fourth embodiment of the present disclosure.
Figure 13:
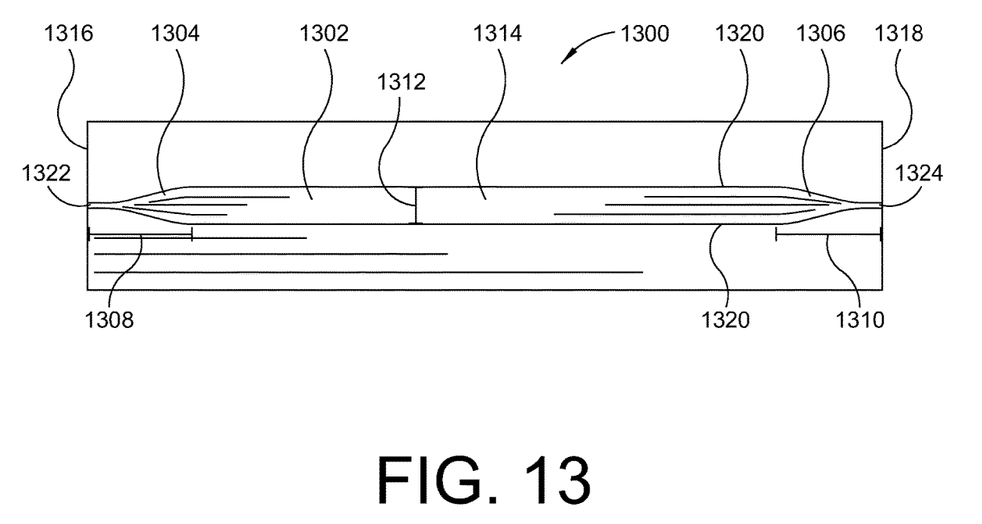
FIG. 13 illustrates a top view of an ultrasonic sealing tool and tool profile according to a fifth embodiment of the present disclosure.

Depicted in FIG. 12 is an ultrasonic anvil 1200 according to another embodiment of the present disclosure. The ultrasonic anvil 1200 includes a tool profile having a planar base surface 1202 and a raised seal line contour 1204 having sections of different cross-sectional masses across the length 1206 of the anvil 1200. The raised seal line contour 1204 includes a first portion 1208 having a first cross-sectional mass (or, "radius") 1214 with a transitional characteristic, a second portion 1210 having a second cross-sectional mass 1216, a third portion 1212 having a third cross-sectional mass 1218 also with a transitional characteristic, and a crest line having a uniform height above the planar base surface 1202 across all three portions 1208, 1210, 1212. In some embodiments, the first portion 1208 and third portion 1212 have equal cross-sectional masses. The first portion 1208 and the third portion 1212 have cross-sectional masses which transition from the second cross-sectional mass 1216 to lesser mass ends 1220, 1222, for example, the radius tapering to a zero radius at ends 1220, 1222. The transition lengths 1224, 1226 can be selected based on a potential range of movement in the location or width along the length 1206 of the seal line contour 1204 made by the material layers during sealing that are associated with the first 1208 and third 1212 portions of the seal line contour 1204. In some embodiments, the first 1208 and third 1212 portions do not linearly transition to a lesser mass from the second cross-sectional mass 1216 but instead may, for example, non-linearly transition. For example, as depicted in yet another embodiment of the present disclosure, the ultrasonic anvil 1300 of FIG. 13 illustrates a seal line contour 1302 having first portion 1304 and third portion 1306 with non-linear cross-sectional mass transitions 1308, 1310 from the cross-sectional mass 1312 of the second portion 1314 to the ends 1316, 1318 of the anvil 1300. Additionally or alternatively, the end portions 1322 and 1324 may include a length having a constant cross-sectional mass that is less than the cross-sectional mass 1312, with the transitional portions 1304 and 1306 each coupling the respective end portion 1322 and 1324 to the second portion 1314.

In some embodiments, the edges 1228, 1320 of the raised seal line contours 1204, 1302 separating the peak of the raised seal line contours 1204, 1302 and the planar base 1202, 1326 are curvilinear, or otherwise rounded. In other embodiments, similar to FIG. 9, the edges 1228, 1320 can be squared-off. The ends 1220, 1222, 1322, 1324 of the raised seal line contours 1204, 1302 are curvilinear to make a smooth transition toward the planar base 1202, 1326. In other embodiments, the ends 1220, 1222, 1322, 1324 are squared-off (as illustrated).

Figure 14:
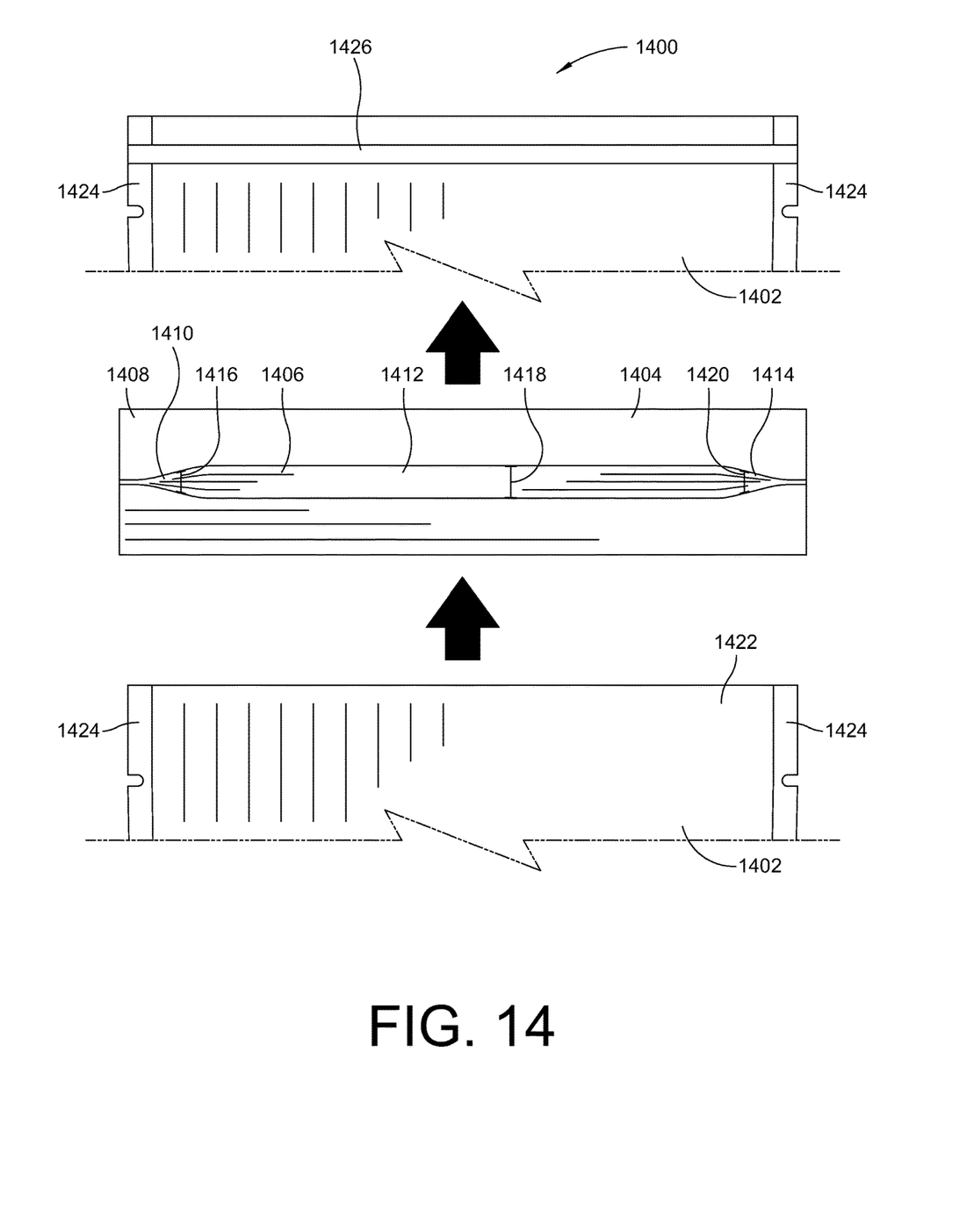
FIG. 14 illustrates the ultrasonic sealing tool of FIG. 13 along with an illustrative package before and after being sealed.

Depicted in FIG. 14 is a method 1400 of sealing an illustrative package 1402, such as a pouch having pre-applied heat seals, according to another embodiment of the present disclosure. The method 1400 includes an anvil 1404 having a tool profile comprised of a seal line contour 1406 and a planar base 1408. To seal the package 1402, the package materials are lined up with the anvil 1404, preferably centered horizontally on the anvil 1404, and the sonotrode (not shown) applies ultrasonic vibrations to the package 1402 while pressing the package 1402 against the anvil 1404. Advantageously, the package 1402 can be positioned such that its heat-sealed areas 1424 line up with portions of the anvil 1404 having reduced mass. A reduced mass portion of the seal line contour 1406 can reduce the energy applied to pre-applied heat-sealed areas 1424 of the material film, thereby preventing overstressing of those portions of material film. This also simultaneously ensures sufficient sealing in areas of the tool profile having an increased mass and applied to the non-heat-sealed area 1422.

The cross-sectional mass of the raised seal line contour 1406 can vary based on the variations in material composition expected along the length of the seal line contour 1406. The seal line contour 1406 mass provided by the second portion 1412 of the anvil 1404 in pre-heat-sealed areas 824 is reduced by providing a smaller radius while maintaining a uniform crest line height above the planar base surface 1408 across the entire length of the seal line contour 1406. For example, the seal line contour 1406 can include first 1410 and third 1414 portions having reduced cross-sectional masses 1416, 1420 to be applied to seal non-heat-sealed areas 1422 of packaging material. For the pre-heat-sealed areas 1424 of packaging material, the seal line contour 1406 can include a second portion 1412 corresponding to the location of that material 1424 and having a larger cross-sectional mass 1418, such as a mass with a 1.0 millimeter radius. Varying the cross-sectional mass of the anvil 1404 prevents excess sealant melting, overstressing and weakening, or other damage to the material film that would likely otherwise occur if a uniform tool profile mass (as illustrated in FIG. 1) is used for the seal line contour 1406 regardless of variations in composition of the material to be sealed. Therefore, the finished end seal 1426 is uniform in appearance, footprint, and strength across the entire seal 1426.

Although each tool profile, such as those illustrated and described in FIGS. 3-14, is located on the ultrasonic anvil, it should be appreciated that the tool profile could instead be located on the face of the sonotrode which contacts the material and anvil. Further, it should be appreciated that multiple parallel seal lines could be provided in any embodiment described herein such as to result in multiple parallel seals in the packaging. A sharp cutting edge may also be included in the tool profile, for example, between parallel seal lines to simultaneously seal and separate multiple packages in one ultrasonic sealing machine motion.

Reference systems that may be used herein can refer generally to various directions (e.g., upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed is:

1. An apparatus for ultrasonic sealing, comprising:
   a base; and
   a tool profile for sealing a material, the tool profile supported by the base and defining a raised surface extending across a length of the base and having a crest line of uniform height above the base extending across the raised surface; and
   wherein the raised surface includes a first portion of the length having a first cross-sectional mass and a second portion of the length having a second cross-sectional mass; and
   wherein the first cross-sectional mass is less than the second cross-sectional mass.

2. The apparatus of claim 1, wherein the base and the tool profile are defined by an anvil configured for use in ultrasonic sealing.

3. The apparatus of claim 1, wherein the base and the tool profile are defined by a sonotrode configured for use in ultrasonic sealing.

4. The apparatus of claim 1, wherein the raised surface further includes:
   a third portion of the length, the third portion having a third cross-sectional mass which is equal to the second cross-sectional mass; and
   wherein the first portion is located between the second and third portions.

5. The apparatus of claim 4, wherein the raised surface further includes:
   a first transitional portion connecting the first portion to the second portion, the first transitional portion having a first varying cross-sectional mass which transitions from the first cross-sectional mass, where connected to the first portion, to the second cross-sectional mass, where connected to the second portion; and
   a second transitional portion connecting the first portion to the third portion, the second transitional portion having a second varying cross-sectional mass which transitions from the first cross-sectional mass where connected to the first portion to the third cross-sectional mass where connected to the third portion.

6. The apparatus of claim 4, wherein:
   the second and third portions of the length of the raised surface define a squared corner between the base and the crest line of the raised surface; and
   the first portion of the length of the raised surface defines a curvilinear surface extending vertically above the base, through the crest line, and returning to the base.

7. The apparatus of claim 1, wherein the raised surface further includes:
   a third portion of the length, the third portion having a third cross-sectional mass which is equal to the first cross-sectional mass;
   wherein the second portion is located between the first and third portions.

8. The apparatus of claim 7, wherein the raised surface further includes:
   a first transitional portion connecting the first portion to the second portion, the first transitional portion having a first varying cross-sectional mass which linearly transitions from the first cross-sectional mass where connected to the first portion to the second cross-sectional mass where connected to the second portion; and
   a second transitional portion connecting the second portion to the third portion, the second transitional portion having a second varying cross-sectional mass which linearly transitions from the second cross-sectional mass where connected to the second portion to the third cross-sectional mass where connected to the third portion.

9. The apparatus of claim 7, wherein the second portion of the length of the raised surface define a squared corner between the base and the crest line of the raised surface; and the first and third portions of the raised surface defines a curvilinear surface extending vertically above the base and returning to the base.

10. The apparatus of claim 1, wherein:
    the base defines a planar base surface;
    the raised surface defines an edge along the length and between the planar base surface and the crest line of the raised surface; and
    the edge includes a squared corner.

11. The apparatus of claim 1, wherein the raised surface defines at least one curvilinear surface extending vertically above the base, through the rest line, and returning to the base.

12. The apparatus of claim 11, wherein:
the first portion of the length of the raised surface defines a first curvilinear surface having a first radius;
the second portion defines a second curvilinear surface having a second radius; and
the first radius is not equal to the second radius.

13. The apparatus of claim 1, wherein the crest line is a straight line.

14. An ultrasonic sealing apparatus configured to seal a material with portions having at least a first and second thickness or material characteristic, comprising:
a sonotrode;
an anvil; and
a tool profile defined by at least one of the sonotrode and anvil;
wherein the tool profile defines a planar base and an elevated seal line contour protruding from the planar base, the elevated seal line contour including at least a first portion and a second portion along a length of the anvil; and
wherein:
the first portion has a first cross-sectional mass, the second portion has a second cross-sectional mass, and the second cross-sectional mass is less than the first cross-sectional mass; and
the elevated seal line contour protrudes a uniform maximum height from the planar base along the entire length of the elevated seal line contour.

15. The apparatus of claim 14, wherein the first portion of the tool profile defines a first radius, the second portion of the tool profile defines a second radius, and the second radius is less than the first radius.

16. The apparatus of claim 14, comprising:
a third portion of the elevated seal line contour, the third portion having a third cross-sectional mass which is equal to the first cross-sectional mass;
wherein the second portion is located between the first and third portions.

17. The apparatus of claim 14, comprising:
a third portion of the elevated seal line contour, the third portion having a third cross-sectional mass which is equal to the second cross-sectional mass;
wherein the first portion is located between the second and third portions.

* * * * *

UNITED STATES PATENT AND TRADEMARK OFFICE
CERTIFICATE OF CORRECTION

PATENT NO. : 10,632,684 B2
APPLICATION NO. : 15/992676
DATED : April 28, 2020
INVENTOR(S) : Uwe Peregi et al.

It is certified that error appears in the above-identified patent and that said Letters Patent is hereby corrected as shown below:

On the Title Page

Item "(72) Inventors:" section, after the second inventor "Scott Weiss, Bartlett, IL (US)" please add the following inventor --; Keith Chavez, Roselle, IL (US)--.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*